12/6/77 XR 4,062,009

United States Patent [19]

Raverdy et al.

[11] 4,062,009

[45] Dec. 6, 1977

[54] ELECTROPHORETIC DISPLAY DEVICE

[75] Inventors: Yvan Raverdy; Jean Luc Ploix, both of Paris, France

[73] Assignee: Thomson-CSF, Paris, France

[21] Appl. No.: 704,905

[22] Filed: July 13, 1976

[30] Foreign Application Priority Data

July 17, 1975 France ................................ 75.22353

[51] Int. Cl.2 ............................ G06F 3/14; G09F 9/32

[52] U.S. Cl. ............................ 340/324 R; 204/299 R; 340/336; 340/378 R; 350/267

[58] Field of Search .......... 340/324 R, 324 M, 378 R, 340/336; 350/160 R, 161, 267; 204/299 R, 300

[56] References Cited

U.S. PATENT DOCUMENTS

| | | | |
|---|---|---|---|
| 3,303,488 | 2/1967 | Anderson | 340/324 R |
| 3,376,092 | 4/1968 | Kushner | 340/324 R |
| 3,812,490 | 5/1974 | Goodrich | 340/324 R |
| 3,892,568 | 7/1975 | Ota | 340/324 M |
| 3,909,116 | 9/1975 | Kohashi | 204/299 R |

*Primary Examiner*—Marshall M. Curtis
*Attorney, Agent, or Firm*—Roland Plottel

[57] ABSTRACT

An information display device utilizing the phenomenon of electrophoresis. It comprises two transparent electrodes parallel to one another and assembled in order to constitute a sealed cell filled with a colored fluid, and a thin porous diaphragm scattering the light in a color differing from that of the fluid, the diaphragm being arranged in the vessel parallel to the electrodes. The diaphragm displaces by electrophoresis, from one electrode to the other, under the action of potential differences applied to the electrodes.

14 Claims, 8 Drawing Figures

ELECTROPHORETIC DISPLAY DEVICE

The present invention relates to an information display device utilising the phenomenon of electrophoresis.

Those skilled in the art will be aware that electrophoresis is the phenomenon according to which electrically charged pigment particles displace in a liquid under the effect of an electric field.

Display devices utilising this phenomenon are already well known. Each of the display cells is constituted by two parallel electrodes arranged opposite one another and assembled together in order to form a closed vessel; the vessel is filled with a coloured liquid in which a pigment having a radical scattering effect upon incident light, is held in suspension; the pigment is chosen to have a colour which contrasts with that of the liquid. The application of a potential difference between the electrodes gives rise to the migration of pigment particles toward one of the electrodes, in accordance with the direction of the electric field produced. When they adhere to the electrode located at the side adjacent the observer, the ambient light is scattered by the pigment. When they adhere to the other electrode, the light is absorbed by the liquid filling the cell. Moreover, these devices have a storage effect: the particles remain attached to the electrode in the absence of any electric field, under the effect of VAN DER WAALS forces, and it is therefore solely the application of a field of reverse direction which makes it possible to erase the information.

However, devices of this kind have a certain number of drawbacks which are associated with the difficulty of producing the suspension which fills the cell. In other words, this suspension must first of all be entirely stable, that is to say that there should be neither sedimentation nor floculation even after a large number of displays; as far as the pigment is concerned, this requires a substantial superficial charge density which does not change to any great extent, and as far as the liquid is concerned, perfect chemical and electro-chemical stabilities as well as high resistivity, in order to make it possible to apply substantial electric fields. Also, the composition of the suspension should be such that the contrast is good in conditions of ambient lighting. Finally, the response time of the device should be sufficiently short (typically of the order of some few tenths of a second) although this depends upon the rate of displacement of the particles, which rate itself depends in particular upon the superficial charge density of the pigment.

The object of the present invention is a display device using electrophoresis, comprising two substrates, a front substrate disposed towards incident light and a back substrate, said substrates carrying electrodes, at least said front substrate and its electrodes being transparent, said substrates being substantially parallel and attached together in order to form a closed vessel filled with a resistive fluid; said display device further comprising a thin diaphragm arranged in said vessel and permeable to said fluid, said diaphragm being capable of scattering the incident light in a colour differing from that of said fluid; means for applying a potential difference between at least one electrode on said front substrate and at least one electrode on said back substrate, thus developing an electric field between said substrates and making at least part of the diaphragm to be stick on one of the two substrates in accordance with the direction of said electric field.

For a better understanding of the invention and to show how it may be carried into effect, reference will be made to the ensuing description and the related drawings in which similar references designate similar elements and in which:

FIGS. 1*a* and 1*b* illustrate the principe of operation of the display device in accordance with the invention;

FIG. 2 is a diagram of an embodiment of the diaphragm used in this device; FIG. 3 schematically illustrates an embodiment of a multi-point display device using a flexible diaphragm, in accordance with the invention;

FIGS. 4*a* and 4*b* are diagrams of variant embodiments of the diaphragm used in the device in accordance with the invention;

Figure 1:
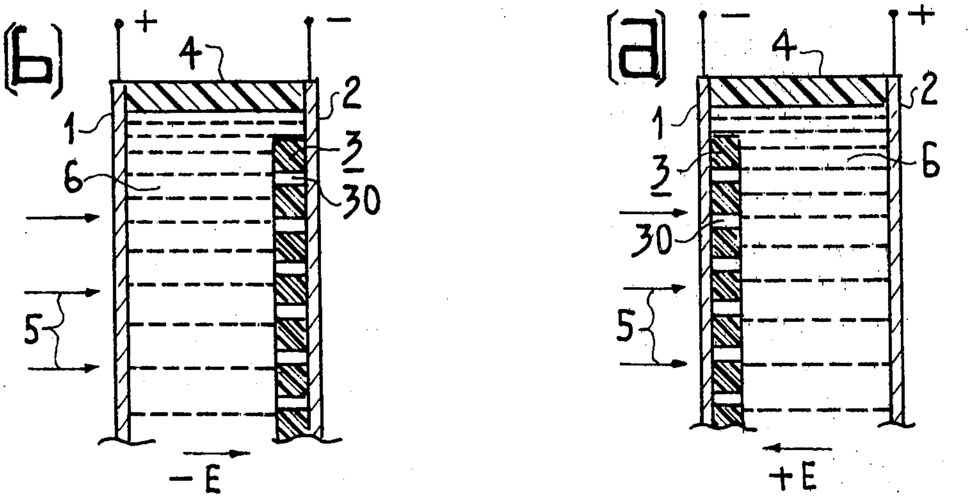

In FIG. 1, two electrodes 1 and 2 have been shown, one at least of which is transparent, that is to say the electrode 1 located at the side disposed towards the incident light 5. The electrodes 1 and 2 are mutually parallel and attached together by spacers such as 4, in order to form a sealed vessel or cell which is filled with a coloured fluid 6, for example trichlorethylene, containing a blue azoic colorant in the saturation state, the liquid having high resistivity (of the order of $10^9$ Ω.cm for example). The vessel also contains a thin diaphragm 3.

Those skilled in the art will be aware that the phenomenon of electrophoresis is due to the double layer of electrical charges generally created when pigment particles are suspended in a liquid, at the particle-liquid interfaces. The thus charged particles, positively or negatively charged, may be set into motion by the application of an electric field. The same phenomenon of surface electric charge occurs in the present instance. However, if this charge is insufficient in practice, it is possible to increase it by treating the surface of the diaphragm, for example using a salt one of the ions of which can be absorbed at the surface of the diaphragm.

The diaphragm 3, in order to be able to displace under the action of an electric field, must be permeable to the fluid 6. In FIG. 1, the permeability is achieved by the presence of passages 30 whose shape is of no importance, but whose density and dimensions (determined experimentally) must be such as to permit the diaphragm 3 is arranged freely in the vessel and should preferably have a density close to that of th fluid 6, in order to prevent any friction at the vessel edges.

Finally, the diaphragm must also produce radical scattering in the incident light this indeed in a colour sufficiently different from that of the fluid 6 to obtain a contrasted display.

The operation of the device is as follows: a potential difference is applied to the electrodes 1 and 2, creating an electric field $\vec{E}$, for example from the electrode 2 towards the electrode 1 (FIG. 1*a*). If the diaphragm 3 is positively charged, it sticks to the front electrode 1 and scatters the incident light, thus displaying information in the form of a clear zone. When the field $\vec{E}$ is removed, the diaphragm remains in position under the effect of the VAN DER WAALS forces, and the information is stored.

To erase it, that is to say to displace the diaphragm 3 towards the back electrode (2), it is necessary to apply a field — $\vec{E}$ (FIG. 1*b*). The diaphragm 3 sticks to the electrode 2 and the light is absorbed by the fluid 6, the cell then presenting a dark colour contrasting with that of the preceding state. Similarly, when the field is removed, the diaphragm remains in position.

Figure 2:
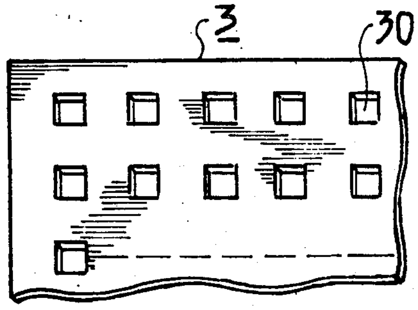

FIG. 2 illustrates schematically an embodiment of the diaphragm 3. It is made of a rigid material, for example glass. In this material, using a known kind of etching technique, passages of for example square section as shown in FIG. 2, are formed. To the grid thus obtained, a layer of pigment having a radical scattering action, for example titanium oxide, is applied by carrying out sedimentation in the presence of a binder.

Other embodiments are of course possible as far as the diaphragm is concerned. It could for example be constituted by a plastic material, the pigment being incorporated into the mass thereof, or being applied to its surface.

It could also be formed, not using a rigid plate in which passages are formed, but by a woven fibre material. However, this embodiment has a drawback: the major attenuation which occurs in the storage effect. In other words, VAN DER WAALS forces are proportional to the areas which are in contact (diaphragm-/electrode) and become very small in the case of woven structures. A simple means of overcoming this defect is to maintain a constant voltage across the terminals of the cell.

Figure 3:
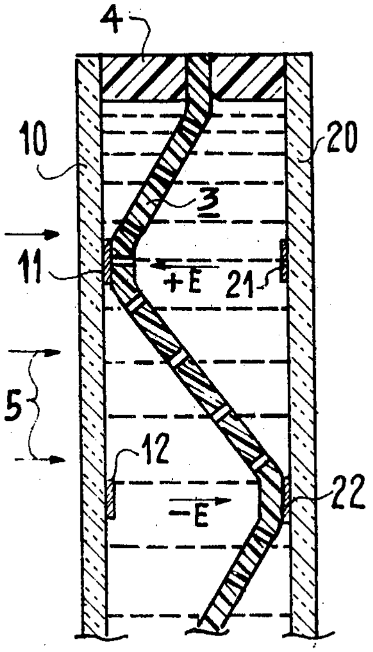

FIG. 3 schematically illustrates an embodiment of a multipoint display device in accordance with the invention, using a flexible diaphragm.

In this figure, the electrodes 1 and 2 of FIG. 1 have been replaced by transparent substrates 10 and 20 to which there have respectively been applied two matrices of transparent electrodes located opposite one another (in FIG. 3, electrodes 11 and 12 on the substrate 10, which are respectively opposite the electrodes 21 and 22 on the substrate 20). The electrodes of each matrix are controlled independently of one another.

The diaphragm 3 is a permeable and flexible diaphragm attached around the whole of its periphery to the spacer 4 in order to locate it centrally in the cell. It is constituted by an elastic, deformable material, for example a silicone elastomer incorporating titanium oxide in order to improve the light scattering effect.

Operation is the same for the point matrix thus created, as it was before in the case of a single piece of information. In other words, the elastic restoring forces which act upon the diaphragm as a function of the modulus of elasticity of the material, are negligible compared with the electrostatic forces controlling the deformation of the diaphragm.

Figure 4:
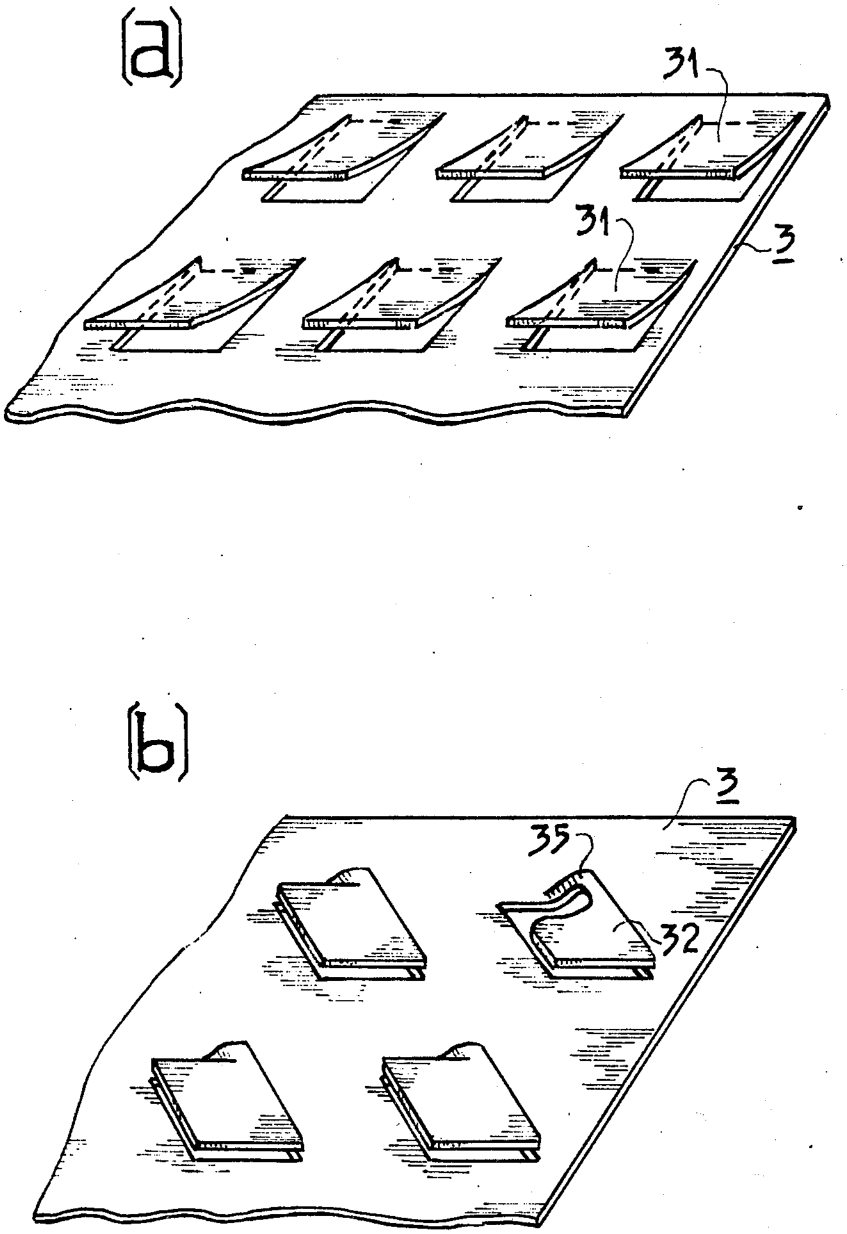

FIG. 4*a* and 4*b* schematically illustrate other embodiments of the diaphragm utilised in another embodiment of the device in accordance with the invention.

In this variant embodiment, not shown but not unlike that of FIG. 3, the device comprises, as in the case of FIG. 3 also, two transparent substrates 10 and 20 upon each of which a matrix of electrodes (11, 12; 21, 22) is deposited, but in this case the diaphragm 3 is fixed around the whole of its periphery to the back face (20) of the device and it comprises semi-free elements arranged opposite the electrode matrices. Each semi-free element, depending upon the direction of the field, remains stuck to the back face or moves into contact with the front face, thus constituting a display point.

In FIG. 4*a*, the semi-free elements (31) are obtained simply by cutting out three sides of a square whose area is close to that of the electrodes (such as 21 in FIG. 3).

In FIG. 4*b*, each semi-free element (32) is produced by cutting out virtually the whole of the perimeter of the square, simply leaving a thin tongue (35) for attachment to the remainder of the diaphragm.

Figure 5:
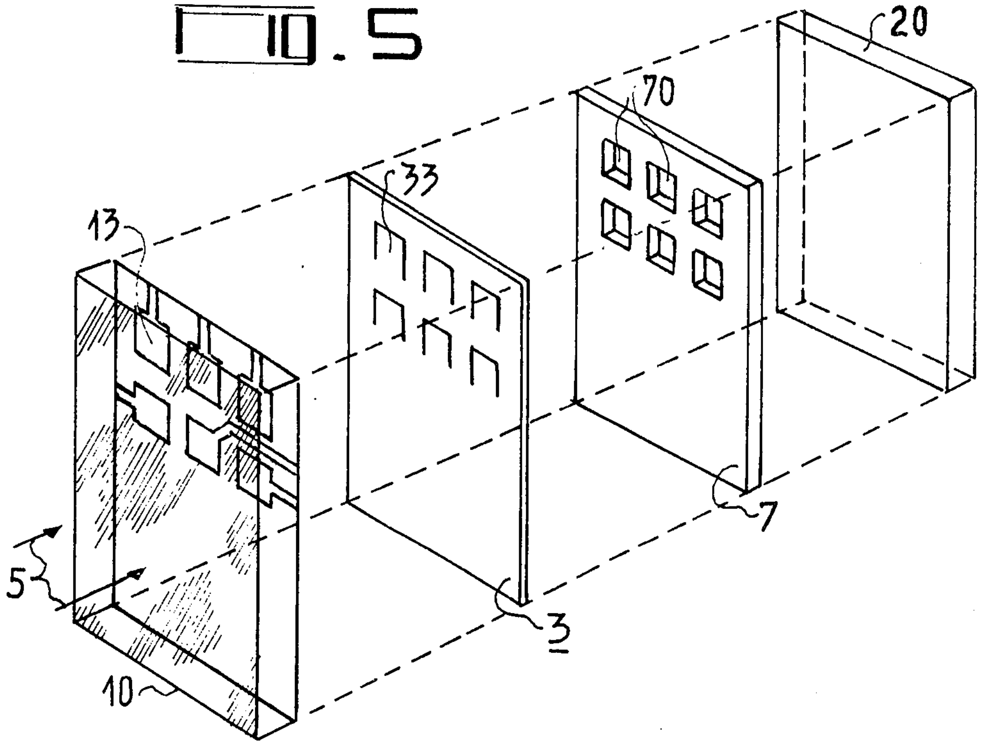
FIG. 5 is a variant embodiment of a multi-point display device.

FIG. 5 is a variant embodiment of the device in accordance with the invention. This figure shows:

- a substrate 10 which is an insulator and transparent one, exposed to the incident light 5 and carrying a matrix of transparent electrodes 13, for example square in shape, formed by conductive deposits provided with connections to the periphery of the substrate 10;
- a flexible and porous diaphragm 3 containing a matrix of cutouts 33 such as those described in FIGS. 4*a* or 4*b*, arranged opposite the electrodes 13;
- a spacer 7 made of an insulating plate, parallel to the aforesaid elements (10 and 3) and provided with cut-outs 70 substantially of the same shape and located opposite the electrodes 13;
- a back substrate 20 covered on its internal face either with a matrix of electrodes (not shown) opposite those 13, or with a single electrode (not shown), placed for example at a constant potential, the selection of the displayed points being performed in this case by the electrodes 13 alone.

As before, the substrates 10 and 20 are assembled in order to form a sealed cell which is filled with a coloured liquid, the semi-free elements 33 of the diaphragm 3, when they are made to stick against the front face 10, producing scattering of the incident light 5 in a colour which differs from that of the liquid.

It should be pointed out that the respective positions of diaphragm 3 and spacer 7 may be reversed. Similarly, it is possible to add a second spacer similar to the element 7, between the diaphragm 3 and the front face 10.

Figure 6:
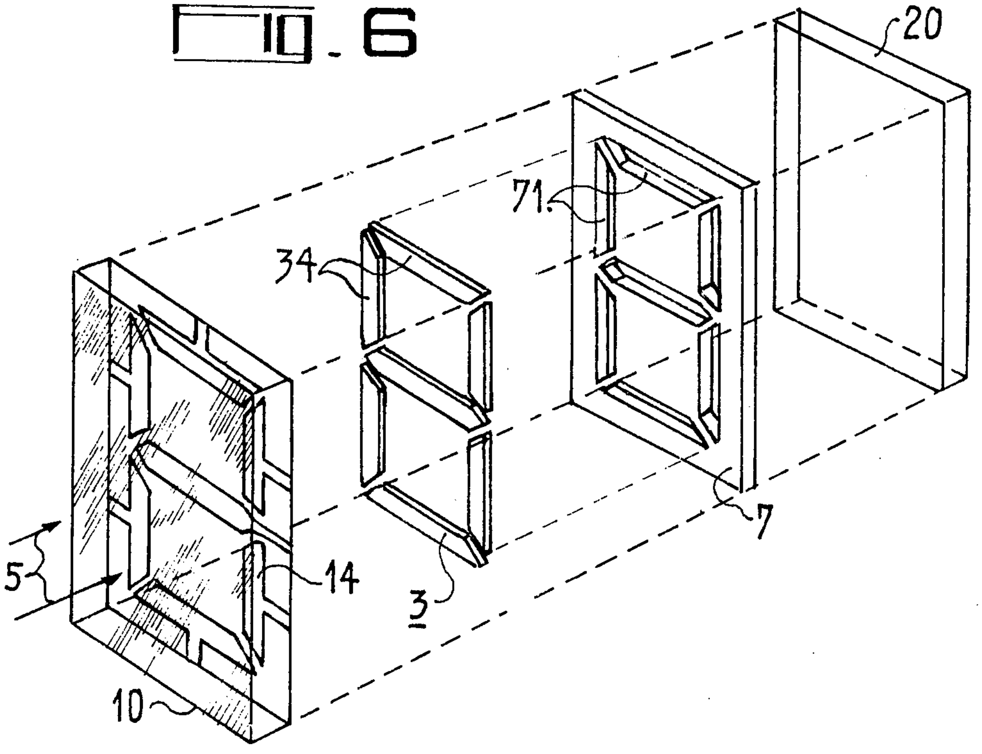
FIG. 6 illustrates the application of the device in accordance with the invention to the display of an alpha-numerical character.

FIG. 6 illustrates another embodiment of the device in accordance with the invention, designed to display a so-called seven-segment alphanumerical character.

In this figure there can be seen, as in FIG. 5, the insulating substrate 10, the diaphragm 3, the spacer 7 and the substrate 20.

The front face 10 carries certain electrodes 14 or segments of elongated shape, these segments being transparent and disposed in a conventional way in order to form two adjacent squares equipped with connections linking them to the periphery of the substrate and supplied independently of one another. The spacer 7 which is an insulator, contains seven cut-outs 71 reproducing the shape of the electrodes 14 and located opposite said latter. The diaphragm 3 is constituted by seven segments 34 having the same shape as the electrodes 14, arranged freely in the cavities formed by the cutout 71 at the time when the device is assembled.

Display of a given character is performed by selection of the corresponding electrodes 14 which are placed at a sufficient potential for the segments 34 of the diaphragm to stick against the front face of the cell.

The device in accordance with the invention, in one or other of its embodiments, can of course be used for any kind of display but it is particularly well suited to large-scale displays, a cell for displaying an alphanumerical character typically having a size of the order of a $dm^2$.

Of course the invention is not limited to the embodiments described and shown which were given solely by way of example.

What is claimed is:

1. A display device using electrophoresis, comprising two substrates, a front substrate disposed towards incident light and a back substrate, said substrates carrying electrodes, at least said front substrate and its electrodes being transparent, said substrates being substantially parallel and attached together in order to form a closed vessel filled with a resistive fluid; said display device further comprising a thin electrophoretically displaceable diaphragm arranged in said vessel and permeable to said fluid, said diaphragm being capable of scattering the incident light in a colour differing from that of said fluid; means for applying a potential difference between at least one electrode on said front substrate and at least one electrode on said back substrate, thus developing an electric field between said substrates thereby making at least part of the diaphragm to apply on one of the two substrates in accordance with the direction of said electric field, said incident light being scattered when said diaphragm is applied on said front substrate, and being substantially absorbed by said fluid when said diaphragm is applied on said back substrate.

2. A device according to claim 1, wherein said diaphragm is arranged freely in said vessel, and is constituted by a rigid material.

3. A device according to claim 1, wherein said front substrate carries a plurality of electrodes which can be controlled independently of each other.

4. A device according to claim 3, wherein said plurality of electrodes is a matrix of electrodes having substantially identical shapes, arranged in accordance with rows and columns.

5. A device according to claim 3, wherein said front substrate carries electrodes of elongated shape, or segments, whose graphic combination is capable of forming an alphanumerical character.

6. A device according to claim 3, wherein said diaphragm comprises a plurality of semi-free elements constituted by a partial cutting out of said diaphragm, said elements being located opposite said electrodes and each of said semi-free elements constituting an information display zone.

7. A device according to claim 6, wherein said diaphragm is fixed to said back substrate.

8. A device according to claim 6, further comprising at least one electrically insulating plate arranged between said diaphragm and one of said substrates.

9. A device according to claim 3, wherein said diaphragm is attached around the whole of its periphery so that it is parallel to said substrates and out of contact therewith, and is constituted by an elastic and deformable material.

10. A device according to claim 5, wherein said diaphragm is constituted by a plurality of segments of substantially the same shape and size as said electrodes, said device further comprising a thick electrically insulating plate located between the two substrates opposite said electrodes, said segments being located freely in opening formed in said plate.

11. A device according to claim 1, wherein said diaphragm comprises a plurality of passages in the material of which it is made, thus achieving the permeability of said diaphragm.

12. A device according to claim 1, wherein said diaphragm has a density close to that of said fluid.

13. A device according to claim 1, wherein said diaphragm is constituted by a woven fibre material.

14. A device according to claim 1, wherein said diaphragm is constituted by a plastic material comprising a pigment capable of scattering the incident light.

* * * * *